(12) United States Patent
DeLonge et al.

(10) Patent No.: US 6,342,163 B1
(45) Date of Patent: Jan. 29, 2002

(54) APPARATUS AND METHOD FOR SANITIZING AND CLEANING A FILTER SYSTEM

(75) Inventors: Harry C. DeLonge, Amenia, NY (US); Michael G. Costello, Nashua, NH (US); Karen L. Asher, Cincinnati, OH (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/438,214

(22) Filed: Nov. 12, 1999

(51) Int. Cl.[7] .............................. C02F 1/00; B01D 24/46
(52) U.S. Cl. ...................... 210/749; 210/764; 210/108; 210/275
(58) Field of Search ................................. 210/749, 754, 210/755, 764, 766, 106, 108, 269, 275, 902; 422/38

(56) References Cited

U.S. PATENT DOCUMENTS

| | | | |
|---|---|---|---|
| 3,623,978 A | 11/1971 | Boze | 210/54 |
| 3,817,378 A | 6/1974 | Ross | 210/80 |
| RE28,458 E | 7/1975 | Ross | 210/80 |
| 3,974,074 A | 8/1976 | Purdey | 210/81 |
| 4,032,443 A | 6/1977 | Ross | 210/82 |
| 4,177,143 A | 12/1979 | Myers | 210/82 |
| 4,187,175 A | 2/1980 | Roberts et al. | 210/80 |
| 4,228,000 A | 10/1980 | Hoeschler | 210/673 |
| 4,331,542 A | 5/1982 | Emrie | 210/794 |
| 4,366,065 A | 12/1982 | Leslie et al. | 210/695 |
| 4,415,461 A | 11/1983 | Mansel et al. | 210/757 |
| 4,770,793 A | 9/1988 | Treffry-Goatley et al. | 210/769 |
| 4,784,169 A | 11/1988 | Striedieck | 134/111 |
| 4,818,414 A | 4/1989 | Ross | 210/744 |
| 4,923,068 A * | 5/1990 | Crowson | |
| 4,923,601 A | 5/1990 | Drori | 210/107 |
| 5,043,071 A | 8/1991 | Anselme et al. | 210/636 |
| 5,066,402 A | 11/1991 | Anselme et al. | 210/636 |
| 5,080,808 A | 1/1992 | Kim et al. | 210/792 |
| 5,114,595 A | 5/1992 | Hensely | 210/792 |
| 5,166,220 A | 11/1992 | McMahon | 521/26 |
| 5,198,124 A | 3/1993 | Kim et al. | 210/792 |
| 5,221,486 A | 6/1993 | Fassbender | 210/757 |
| 5,227,048 A | 7/1993 | Seibel et al. | 210/94 |
| 5,246,601 A | 9/1993 | Jensen | 210/787 |
| 5,271,849 A | 12/1993 | Devries | 210/747 |
| 5,277,828 A | 1/1994 | Fleming | 210/792 |
| 5,290,457 A | 3/1994 | Karbachsch et al. | 210/792 |
| 5,338,458 A * | 8/1994 | Carrubba et al. | |
| 5,368,752 A | 11/1994 | Vor | 210/792 |
| 5,374,351 A | 12/1994 | Bolton et al. | 210/97 |
| 5,393,433 A | 2/1995 | Espenan et al. | 210/650 |
| 5,476,584 A | 12/1995 | McDougald | 210/108 |
| 5,620,607 A | 4/1997 | Bowle, Jr. | 210/702 |

* cited by examiner

*Primary Examiner*—Betsey Morrison Hoey
(74) *Attorney, Agent, or Firm*—Wolf, Greenfield & Sacks, P.C.

(57) ABSTRACT

An apparatus and methods for sanitizing and cleaning filtration systems is provided. The apparatus includes a chamber fluidly connected to a source of fluid for backwashing the system, and a heat exchanger for increasing the temperature of the fluid. A filter media is positioned within the chamber. The method of sanitization involves backwashing the apparatus to remove debris, then continuing to circulate the backwash fluid through the system while increasing the temperature of the fluid, until the temperature of the water and apparatus is sufficient to deactivate microorganisms. The method may also involve increasing the disinfecting power of the fluid by adjusting the pH of the fluid. The apparatus may be provided with a scavenger to assist in the substantially complete removal of fluid from the chamber during and after a steaming or cleaning process. The method may also involve reducing the pH of the feed water during normal operation to convert monochloramines to dichloramine and trichloramine in order to aid in the removal of chloramines from the feed water.

35 Claims, 8 Drawing Sheets

APPARATUS AND METHOD FOR SANITIZING AND CLEANING A FILTER SYSTEM

BACKGROUND OF THE INVENTION

1. Field of the Invention

The present invention relates to an apparatus and method for sanitizing a filter system, and to methods for improving the quality of filtered water.

2. Description of the Related Art

Filtration systems are widely used in many industries, including, for example, municipal water systems, industrial water systems, the beverage industry, and in pharmaceutical production. These systems are used to improve the quality of a fluid, particularly water, by removing undesirable contaminants such as pathogenic micro-organisms, suspended solids, particulate matter, and dissolved chemicals. Dissolved and suspended chemical contaminants may enter the supply through a number of pathways including pollution, natural processes, and sanitization processes. The concentration levels of these chemicals may be limited by regulation or by end user requirements.

Filtration systems generally utilize a filter media to separate substances from a fluid. Particulate bed, or particle bed filtration systems, involve using particulate matter as the filter media. Particulate beds allow a fluid to pass through the bed while retaining suspended solids and substances dissolved in the fluid. As material accumulates on the surface of the filtration media and in the interstices of the particulate bed, the efficiency of the bed decreases, evidenced by a decrease in filtrate flow and an increased pressure drop across the bed. To return the system to a more efficient state, the bed may be replaced, but it is often more economical to clean the filtration media.

One method of cleaning the filtration media is by backwashing. This procedure involves temporarily reversing the flow of fluid through the filtration media to dislodge contaminants that have accumulated in or that have adsorbed onto the bed. The backwash fluid may be filtered or supply water and, in some instances, detergents or other additives may be added to aid in dislodging contaminants. Generally, the backwash fluid is discharged to waste. In some industries, it is common for some filters, e.g. carbon tower filters, to be backwashed on a regular basis.

Backwashing is often useful in removing the bulk of any micro-organisms from the filtration system, but it does not sanitize the system. In addition, backwashing may introduce some previously retained micro-organisms into the filtrate. As a result, filtration systems may also require regular sanitization of the bed or other parts of the system. For instance, at least weekly sanitization of carbon tower filtration systems is often recommended in the beverage industry.

Sanitization may be achieved through a variety of processes and agents including, for example, chlorine or steam. Such procedures are generally lengthy and require careful monitoring. Typically, the filtration system is out of service while it is being sanitized, and the sanitizing agent often must be purged from the system before the system can be brought back on line.

Municipal water treatment stations typically introduce free chlorine through the use of chlorine gas according to the following reactions:

$$Cl_2 + H_2O \rightleftharpoons HOCl + H^+ Cl^- \quad (1)$$

$$HOCl \rightleftharpoons H^+ + OCl^- \quad (2)$$

Chlorine is an effective sanitization agent for municipal water supplies, but free chlorine tends to react with organic compounds in water systems to produce, for example, tri-halomethanes. The speciation of free chlorine is pH dependent. Therefore, free chlorine can exist as either hypochlorous acid (HOCl) or hypochlorite ion (OCl$^-$) depending on the pH. Hypochlorous acid is much more effective in the destruction of bacteria than is the hypochlorite ion.

Chloramines are also frequently used as sanitizing agents and are more stable in water than conventional chlorine. "Chloramine," as used herein, is a generic term describing the various reaction products of ammonia and chlorine. Chloramines may undesirably affect the characteristics of the product water and any process equipment in contact with the water, such as, for example, reverse osmosis membranes. Therefore, many industrial users, such as producers of pharmaceuticals and beverages, would like to be able to remove sanitizing agents such as chloramines before using the water produced from the filtration system in production processes. Like free chlorine, the speciation of chloramines is pH dependent, with monochloramine predominating at about neutral pH. Chloramines are known to be difficult to remove from water, and industry professionals have struggled with various ways to treat filter beds, particularly GAC, to provide for their more efficient removal. One way that chloramines are currently removed involves adsorbing the chloramines onto carbon. Carbon, however, has a low affinity for the predominant form of chloramine, monochloramine. Moreover, GAC beds require frequent replacement, and may promote the growth of micro-organisms in the system.

Because unwanted chemicals and micro-organisms may be present anywhere in a filter system, it may be desirable to sanitize and cleanse the entire system and not just the particulate bed. In such instances, steam is generally used, which is more thorough than chemicals and backwashing. Steam that is forced through a system will contact many parts of the system. Therefore, steam is capable of sanitizing and cleaning the exposed components of filter systems, not just the filter media. However, as steam condenses, the condensate may accumulate in pockets that are known as "dead spots." Thus, pockets of contaminated condensate and associated contaminants may remain in the system, free to recontaminate the filter bed.

All conventional methods of sanitizing a filtration system suffer from inefficiencies and/or limited effectiveness. Conventional backwashing and sanitization generally require large amounts of water and require that the system be off-line for significant periods of time. Moreover, typical chemical sanitization agents are generally expensive and may be toxic. The use of steam to sanitize a system requires significant amounts of energy, which may be expensive, and the process may not be totally effective. Therefore, it has been difficult to maintain a contaminant- and pathogen-free filter system while minimizing water use and system downtime.

Accordingly, a need exists for improved methods and apparatus for sanitization and cleaning of filtration systems.

SUMMARY OF THE INVENTION

Accordingly, in one embodiment, the present invention is directed to a method for sanitizing a filtration apparatus. The method includes providing a filtration apparatus having an inlet at a first end, an outlet at a second end, and a filtration media positioned between the outlet and the inlet. A fluid at a temperature of at least 160° F. is allowed to flow through the apparatus in a direction opposite that of normal operational flow for a period of time sufficient to reduce the viability of any micro-organisms contained in the apparatus. In one aspect, the method involves fluidizing a particulate bed while allowing the fluid to flow through the apparatus. In another aspect, the method involves adjusting the pH of the fluid.

Another embodiment of the invention is directed to an apparatus for sanitizing a filtration system. The apparatus includes an inlet that is in fluid communication with a pump and may be coupled to a filtration system. The pump is in fluid communication with a heat exchanger and with an outlet that may be configured to be coupled to the filtration system. The system may also include an inductor and may be a mobile unit.

In another embodiment, the invention is directed to a filtration system. The filtration system includes a chamber in fluid communication with a first port and second port, the first port including a conduit fluidly connected to the chamber. A filter is positioned in the chamber, and a scavenger is positioned in the conduit. The scavenger provides fluid communication between the chamber and the conduit at a bottom portion of the chamber.

Another embodiment of the invention is directed to a method for providing a substantially chloramine-free aqueous filtrate. The method involves reducing the pH of an aqueous fluid by, for example, adding carbon dioxide. The reduced pH aqueous fluid is then filtered through a filter bed, providing a filtrate that contains lesser quantities of chloramine. Specifically, the method may be used to convert a portion of the monochloramine contained in an aqueous fluid to dichloramine, the latter having a higher affinity for the granular activated carbon (GAC) that may comprise the filter bed. Such a method is capable of extending the useful life of the filter bed.

BRIEF DESCRIPTION OF THE DRAWINGS

These and other features, aspects and advantages of the present invention will become better understood with reference to the following description, appended claims, and accompanying drawings where:

DETAILED DESCRIPTION OF THE INVENTION

The present invention is directed to an apparatus and methods for sanitizing and cleaning a filtration system, to removing organics from the system, and to reducing the amount of chloramines in a filtrate. One aspect of the invention is directed to a method for backwashing and sanitizing a filtration system by fluidizing a particulate bed with a fluid at an elevated temperature. In another aspect, the invention is directed to an apparatus that reduces the amount of retained organic contaminants remaining in a steamed filtration system. Another aspect of the invention is a water treatment process that facilitates removal of chloramines from a water supply and thereby extends the useful life of a filter bed such as GAC.

The methods and apparatus of the invention provide improved sanitization, as well as reduced costs, shorter regeneration cycles, and a safer treated water supply. The invention allows filters to be economically sanitized on a regular basis to reduce possible contamination from pathogenic micro-organisms such as Giardia, Crypto sporidium, E. Coli, and the like. The invention may also provide for more complete removal of organic contaminants and may provide for increased efficiency in the removal of chloramines from a filtrate. Extensive water savings, an option for completely automatic operation, and the ability to remove precipitates and coatings from the filtration media are also possible.

Figure 1:
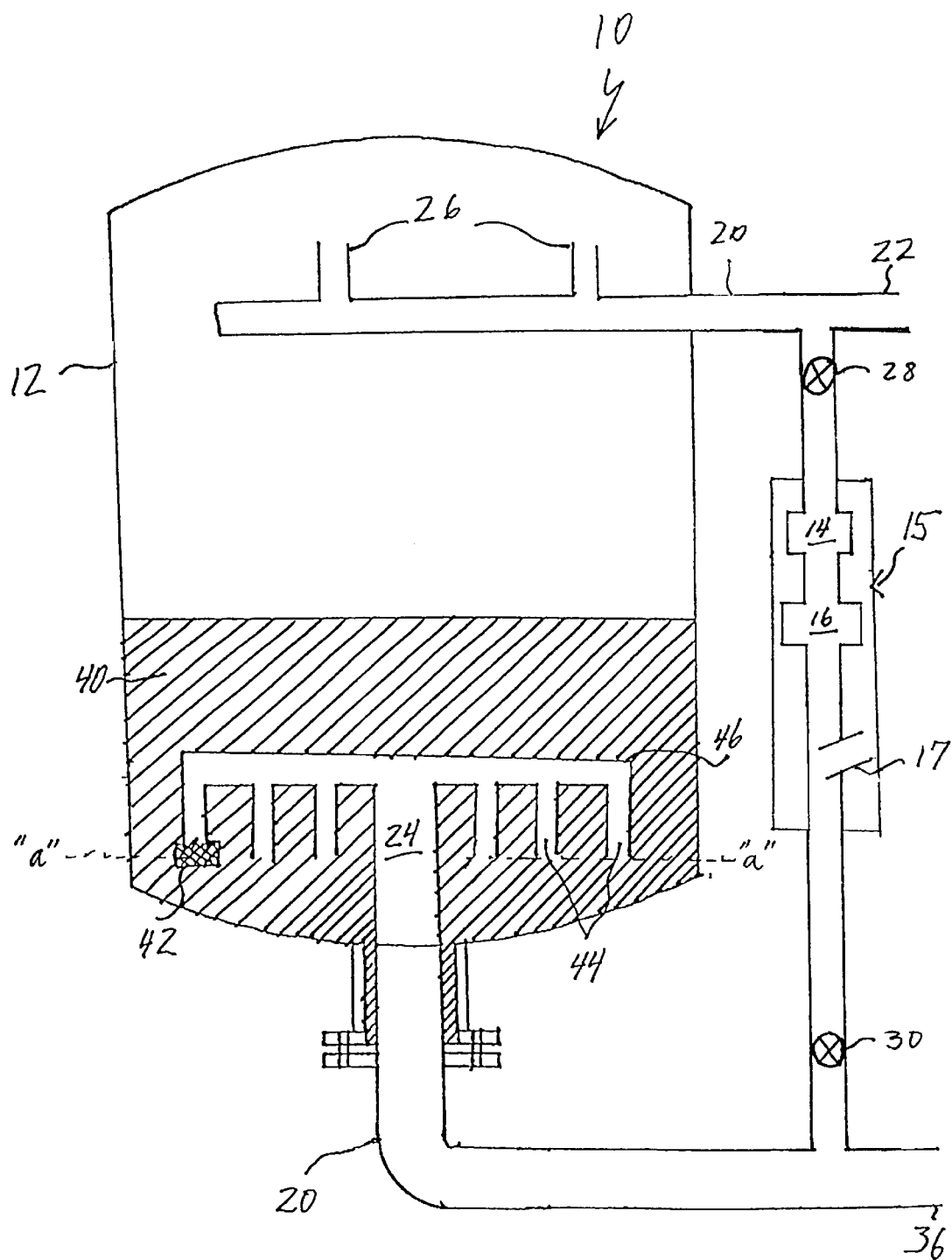
FIG. 1 is a schematic cross-sectional illustration of a filtration system according to the present invention.

FIG. 1 is a schematic cross-sectional illustration of a filtration system 10 according to the present invention. In the present embodiment, system 10 includes a chamber 12, which may be any size or shape including an upright tower, as illustrated herein. The present embodiment also includes a recycling system 15 that may comprise a heat exchanger 14, a pump 16 and an inductor 17 are fluidly connected to the chamber 12 via system piping 20. System piping 20 is fluidly connected to chamber 12 via distribution outlets 26. The heat exchanger 14 may be any apparatus that serves to raise the temperature of a fluid. A filter media 40 is positioned within the chamber 12. Valve 28 is disposed between chamber 12 and the recycling system 15 and is configured to regulate the flow of fluid into the recycling system. Valve 30 is positioned between the recycling system and system piping 20 and is configured to regulate the flow of fluid out of the recycling system into the chamber. The inductor 17, pump 16 and heat exchanger 14 may be placed in any order in the recycling system 15. In the illustrated embodiment the pump is upstream of the heat exchanger which is in turn upstream of the inductor. The recycling system may also include a polisher (not shown). In another embodiment, the recycling system is modular and may be disconnected and reconnected to various filter systems at different times. This allows one recycling system to be used with any number of filter systems. In preferred embodiments, system 10 preferably includes a manifold 46 fluidly connected to conduit 24. Manifold 46 preferably includes a plurality of distribution tubes 44, onto which screens 42 are positioned. The invention is not dependent on the type of manifold or distribution system and may be practiced without the manifold system. In most preferred embodiments, the entire system may be automated.

The filter media may be any material that removes undesirable components from a fluid or otherwise improves the quality of the fluid. Suitable filter media materials include, but are not limited to, sand, glass beads, GAC, diatomaceous earth, other purifiers, and the like. In a preferred embodiment, the filter media is GAC. Certain filter media may also change the properties of the filtrate. For example, GAC may remove halogenated compounds from water, resulting in a filtrate that contains fewer suspended solids and fewer dissolved compounds than does the feed water.

Figure 2:
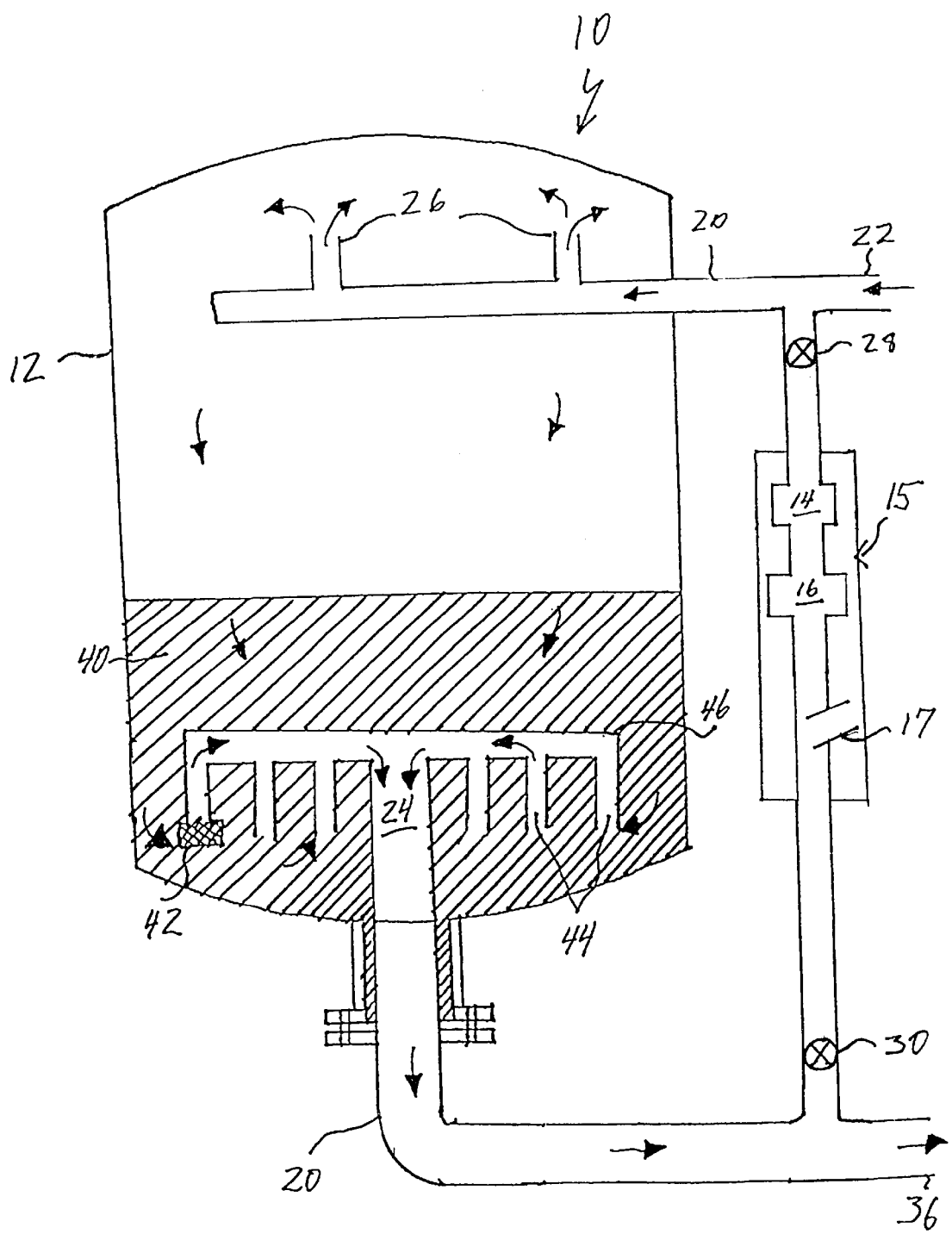
FIG. 2 is a schematic cross-sectional illustration of the filtration system of FIG. 1 during forward operational flow.

FIG. 2 illustrates operation in forward flow of the filtration system 10. Fluid flow is provided in the directions of the arrows illustrated in FIG. 2. The fluid to be filtered is introduced into conduit 22 and flows into chamber 12 via distribution outlets 26. The fluid flows downwardly through filter 40 and upwardly through filter screens 42 into distribution tubes 44. From there, the fluid is gathered by manifold 46, directed through conduit 24, and is discharged through valve 30 and conduit 36 for further treatment, storage, or use.

Figure 3:
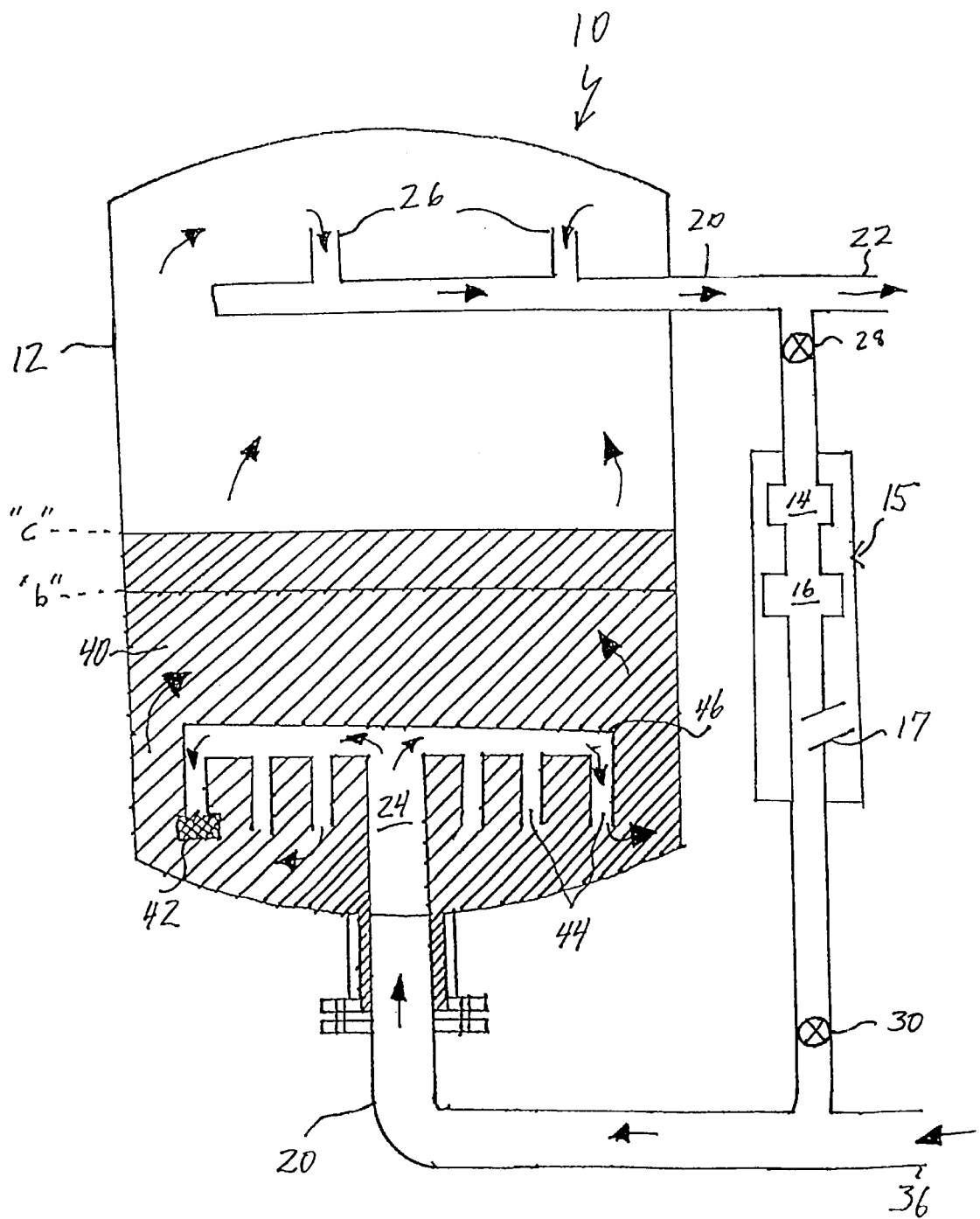
FIG. 3 is a schematic cross-sectional illustration of the filtration system of FIG. 1 during a backwash cycle.
Figure 3A:
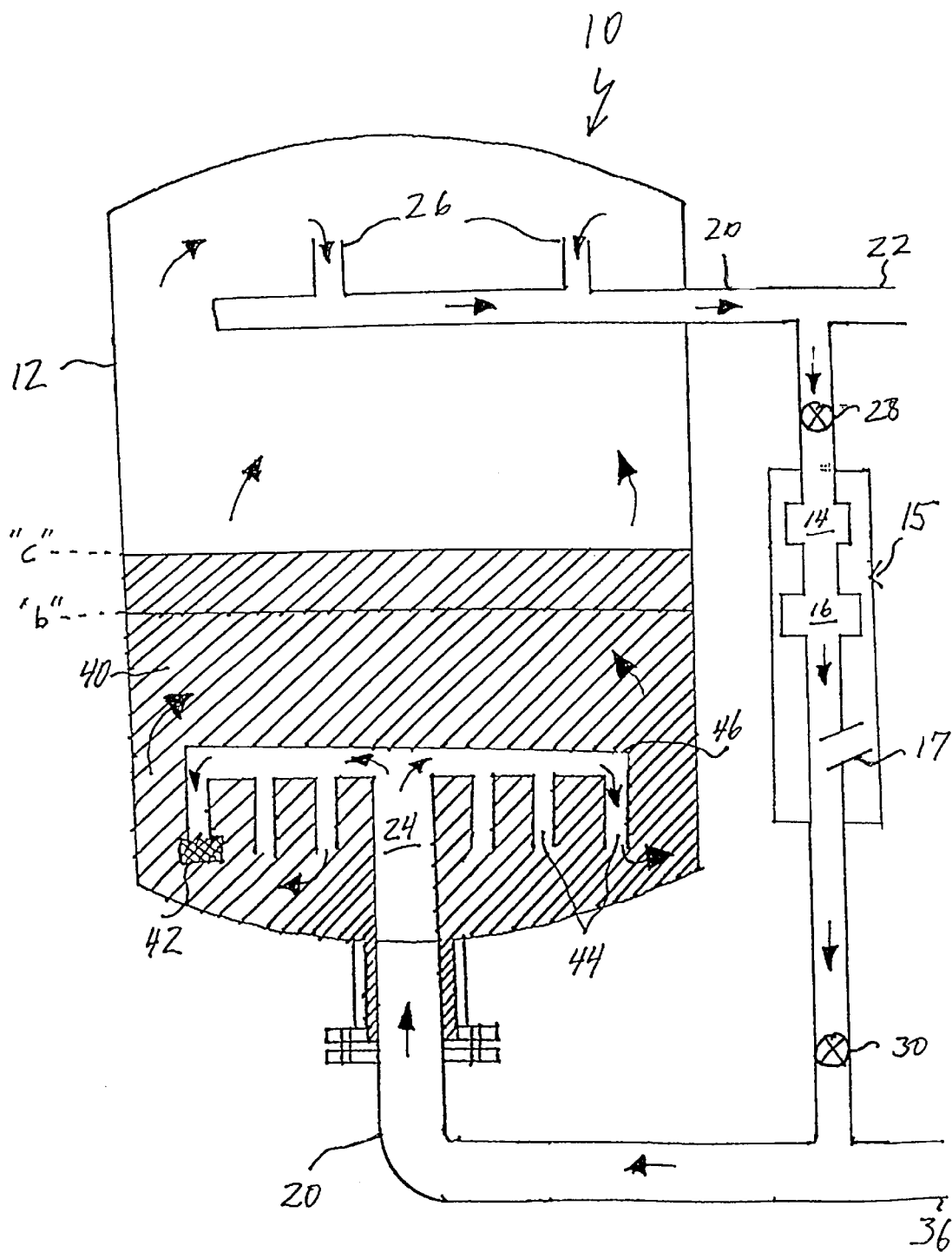
FIG. 3a is a schematic cross-sectioned illustration of the filtration system of FIG. 1 during a recycling phase.

When the filtration system requires cleaning or backwashing, which may be indicated by an increased pressure drop, reduced filtrate volume, or may be required as part of regularly scheduled maintenance, the flow of fluid into conduit 22 is stopped. The direction of fluid flow is reversed from that of normal operation and is shown in FIG. 3. Fluid is then introduced into chamber 12 through conduit 36. The fluid may be introduced into conduit 36 at any temperature. The fluid is then passed upwardly through conduit 24, into manifold 46, through distribution tubes 44, and upwardly through the filter media 40, where contaminants that have been trapped onto the bed are dislodged. The particulate bed may be retained in the chamber by its own weight or, alternatively, may be retained by a physical barrier, such as a porous screen, positioned above the bed (not illustrated). At some later point in time, generally after the bulk of the loosened debris has been discharged from the system through external conduit 22, the recycling system is brought online by reconfiguring valves 28 and 30 and activating pump 16 so that the fluid is redirected through the recycling system 15 and flows in a closed loop. In the embodiment shown in FIG. 3a, the fluid in recycling system 15 first passes through pump 16, then through heat exchanger 14 where the temperature of the fluid is increased and finally comes in contact with inductor 17 before it exits through valve 30 and re-enters the filter system. Thus, the fluid travels in a closed loop with fluid moving in a generally clockwise direction, as illustrated in FIG. 3a. It is preferred that the recycling process start after as many of the suspended solids and contaminants as possible are removed from the system while minimizing the amount of water that must be discharged to waste in order to do so.

During the period of recirculation, fluid is continuously cycled through the system while the temperature of the backwash fluid is elevated by the heat exchanger 14 to a temperature at which targeted micro-organisms are rendered deactivated. "Deactivated," as used herein, means that the targeted micro-organisms are killed, or at least rendered incapable of reproduction, or no longer capable of posing a health hazard to animals or humans. In this manner, the temperature of the entire filter system gradually increases as the fluid temperature increases. Once the fluid and system have reached an adequate temperature, the heat exchanger 14 is turned off and the flow of fluid through the system is stopped. An "adequate" disinfection temperature, as used herein, is that temperature at which a substantial number of the targeted micro-organisms are stressed to the point where they become deactivated. Targeted micro-organisms may be any micro-organism in the fluid or in the filtration apparatus and include Giardia, Crypto sporidium and *E. Coli*. Preferably, at least about 90% of the organisms are deactivated. Most preferably, a temperature is attained that results in a zero count of viable target organisms when the system is restarted in operational mode and a sample of effluent is analyzed. In the present embodiment, the temperature of the fluid is preferably elevated to at least about 160° F., more preferably to at least about 170° F., and most preferably to at least about 180° F.

When the filter media 40 is a particulate bed, the flow of the fluid and the increasing temperature of the bed typically cause it to expand, as illustrated by the difference between lines "b" and "c" in FIG. 3. This expansion may be controlled by adjusting the rate of fluid flow, the rate of temperature increase, the viscosity of the fluid, or the final temperature.

When the backwash and recirculation cycle is stopped, the system is also allowed to cool and, if a particulate bed is used, the bed is allowed to contract and re-settle. When the system is restarted in operational mode, the initial filtrate may be discharged to waste until it is determined that the filtrate meets desired quality standards.

One advantage of the present method is a significantly reduced backwash cycle time, the ability to more frequently sanitize a filtration system and a minimization of downtime associated with the sanitization procedure. It is preferred that the time required to perform the backwash cycle is minimized. The time required for the backwash is determined by several factors, including the amount of accumulated particulates on the filter bed and the composition of those particulates. Backwash cycle times may be minimized by, for example, maximizing the backwash fluid flow rate and maximizing the recycling fluid temperature. The amount of water used in the backwash sanitization procedure may be minimized by switching the flow of fluid to the closed-loop configuration as soon as possible after the start of the procedure. In preferred embodiments, the time that the system is being backwashed to drain is less than about 15 minutes, which is generally a sufficient amount of time to remove accumulated or adsorbed particulates from the filter media. In particularly preferred embodiments, the backwash to drain time is less than about 10 minutes, and most preferably less than about 5 minutes.

The operation time in recycle mode is also determined by a variety of factors. As the system is generally used to deactivate microorganisms, some of the important factors are the temperature at which targeted micro-organisms are deactivated, the capacity of the system, the heat transfer capability of the heat exchanger, the flow rate and the pH of the fluid. Preferably, the recycling step provides an adequate degree of deactivation in less than about 20 minutes and most preferably in less than about 15 minutes.

Accordingly, one aspect of the invention is a method for sanitizing a filtration apparatus with significant time and water savings in comparison to other sanitization techniques. An advantage of the present method is that sanitization may take place on a regular basis during a time period that conventionally was used only to backwash the system of accumulated debris. Thus, all the advantages of backwashing and sanitizing a system are realized with one procedure, and a more sterile filter system is obtained on a more frequent basis.

Another aspect of the method to be used in conjunction with a particulate bed filter 40 involves fluidizing the particulate media to dislodge and remove foreign material. "Fluidized," as use herein, means that at least a portion of the particles of the particulate bed move in relation to each other or in relation to the chamber. Preferably, the backwash fluid flow is maximized to dislodge and remove as much foreign material as possible without damaging the particulate media. For example, a backwash flow equal to about 10 gal/min/ft$^2$ has been found to provide adequate fluidization of a GAC particulate bed.

Another embodiment of the method of the present invention involves adjusting the pH of the backwash fluid in conjunction with the previously described methods. Adjustment of pH allows for effective sanitization with temperatures lower than what would be effective without a pH adjustment. Either low pH or high pH may be effective in certain systems against certain microorganisms. The choice of using a higher or lower pH is dependent upon several factors including the specific target organism, the materials of construction of the system, the cost of the reagents or process and the end use of the water. Adjustment of pH is advantageously used to reduce costs associated with heating the backwash fluid, or with systems that are vulnerable to relatively higher temperatures, such as, for example, those systems that include plastic parts. This aspect of the invention may be employed whenever it is found preferable to using the higher end of the temperature range. In addition, operating at relatively low pH ranges allows the use of lower temperatures during the backwash cycle without reducing the effectiveness of the sanitization.

When adjusting to a pH that is below neutral, the target pH level is determined, in part, by the target organism and by the properties of the water. For example, if the target is a biofilm, a pH of about 6 and a fluid temperature of 160° F. may be adequate to destroy the film. Levels of less than a pH of about 6.0 may be necessary to deactivate target organisms such as Giardia and $E.\ Coli.$ At even lower pH levels, e.g., less than about 4.0, corrosion may become a concern with some systems, and care should be taken to analyze the components of the filter system.

In the present embodiment, the pH of the fluid may be adjusted in any manner, including the addition of acids, bases or buffers. In a preferred embodiment, carbon dioxide, which forms an acid in solution, is used as an effective and inexpensive additive for adjusting the pH of the fluid. In this embodiment, the carbon dioxide is introduced into the fluid through an inductor, such as inductor 17. Preferably, the pH of the backwash fluid may be controlled by monitoring the pH of the downstream fluid with a pH sensor, which is known in the art, and is not illustrated herein. A pH sensor may provide feedback, for example, to the inductor for adjusting the introduction of carbon dioxide or other pH adjusting material. An additional feature of using carbon dioxide to lower the pH of the fluid is that it also serves to displace air from the water, a feature that may be desirable, for example, in the beverage industry.

Additional substances may also be added to the backwash fluid to assist the conditioning or cleaning of the filter system and the filter media, also preferably via an inductor. For example, mineral acids or carbon dioxide may be added to the backwash fluid to aid in the removal of precipitated salts and organic matter.

Another aspect of the invention is a method that provides substantially chloramine-free water by improving the overall removal of chloramines from a water supply. Chloramines include the reaction products of ammonia and chlorine, such as, but not limited to, mono-, di-, and trichloramine. The formation of each species is shown below in reactions (3), (4), and (5) respectively. In an aqueous solution, chloramines are formed by the reaction of hypochlorous acid and ammonia according to the following equations:

$$HOCl+NH_3 \leftrightarrows NH_2Cl+H_2O \quad (3)$$

$$HOCl+NH_2Cl \leftrightarrows NHCl_2+H_2O \quad (4)$$

$$HOCl+NHCl_2 \leftrightarrows NCl_3+H_2O \quad (5)$$

The speciation of chloramine in water depends on the pH of the water and the available free chlorine in the water. For example, at a molar concentration ratio of less than 1:1 chlorine:ammonia, and a pH of about 7.5 or greater, substantially all of the free chlorine is converted to monochloramine. At the same molar ratios of chlorine to ammonia, and slightly lower pH values, the formation of dichloramine predominates. At the same molar ratios of chlorine to ammonia, and at pH values ranging from about 4–4.5, the formation of nitrogen trichloride predominates. Like free chlorine, as the pH is reduced and monochloramine forms dichloramine, the germicidal efficiency increases.

Chloramines are relatively more stable and less reactive in water systems than chlorine. Therefore, they are less likely to form toxic substances. However, the relative stability and lower reactivity of chloramines also makes their removal from water much more difficult than the removal of free chlorine. Removal of free and combined chlorine can be accomplished in several ways. Activated carbon treatment is one effective method. Free and combined chlorine react on the surface of the carbon to create surface oxides and reduced chloride and nitrogen compounds. Chloramine compounds tend to react much more slowly with activated carbon than free chlorine. However, lowering the pH and creating more dichloramine can speed the reaction. The chemistry of the reactions with activated carbon is shown below, where C* is the activated carbon and CO* is a surface oxide:

Monochloramine:

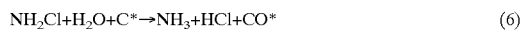

$$NH_2Cl+H_2O+C^* \rightarrow NH_3+HCl+CO^* \quad (6)$$

Dichloramine:

$$2NHCl_2+H_2O+C^* \rightarrow N_2+4HCl+CO^* \quad (7)$$

When surface oxides build up to a certain point, monochloramine can then be removed through a second reaction:

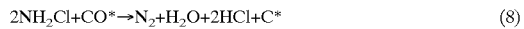

$$2NH_2Cl+CO^* \rightarrow N_2+H_2O+2HCl+C^* \quad (8)$$

The reaction products of dichloramine and activated carbon (inert $N_2$) may be preferable to the reaction products of monochloramine and activated carbon ($NH_3$, a bionutrient). Dichloramine reacts faster with carbon than does monochloramine. Practically, this means that at equivalent molar concentrations, dichloramine will be removed by a carbon bed of less depth than that which would be required for monochloramine.

A variety of chloramines may be present in any treated water supply. The most prevalent of these congeners are monochloramine, dichloramine, and trichloramine. Different filter media are capable of removing chloramines from water with widely varying efficiency depending on the exact congener makeup of the chloramines. For example, dichloramine and trichloramine possess a greater affinity for GAC than does monochloramine. In contrast to other methods that may struggle with ways of removing monochloramine from solution, the invention provides a technique of converting monochloramine, which is highly soluble, to dichloramine and trichloramine, which are much less soluble. The dichloramine and trichloramine are then relatively easily removed from the water by catalytic reaction onto the filter, preferably a GAC filter bed, resulting in a filtrate from which substantially all of the chloramines have been removed. "Substantially removed," as used herein, means at least 50% of the chloramines have been removed. In preferred embodiments at least 90% of the chloramines have been removed.

According to the present method, the pH of the water is preferably adjusted downwardly before the water is passed through the filter. Preferably, the pH of the feed is adjusted to less than 5.0; more preferably, to less than about 4.0. As noted above, in general, more complete conversion of the monochloramine into the higher chloramines will take place with decreasing pH.

Thus, another aspect of the invention is a method for the improved removal of chloramines, without treating the filter bed. Because the method involves the conversion of monochloramine to di- or trichloramine, the method provides more effective sanitization, less toxic reaction products, and easier removal. This aspect of the invention is particularly advantageous for use in the beverage industry, because it may be used with systems as they are currently configured without the need to modify the GAC.

Another aspect of the invention provides substantially complete sanitization and improved removal of undesirable organic compounds from a filter system by reducing or eliminating retained fluid or condensate in the system. As shown in FIG. 1, in operation, when chamber 12 is allowed to drain, the fluid passes through the filter bed 40, through any one of a number of screened distributors 44, into manifold 46 and out of the chamber through conduit 24. When the water level in the chamber declines to the level indicated by line "a," no more water may leave the chamber, as the fluid level is below that of the screened distributors 44. When steam is passed into chamber 12 either from above or through the manifold system 46 shown in FIG. 1, the steam permeates the system, deactivating pathogens and removing organic compounds. Any water contained in the chamber below line "a" however, prevents the entry of the steam into that section of the chamber, and pathogens or organics in that section may remain. Even if the water can be completely drained prior to the steam sanitization procedure, the steam condensate quickly fills the same void with the same result.

Figure 4:
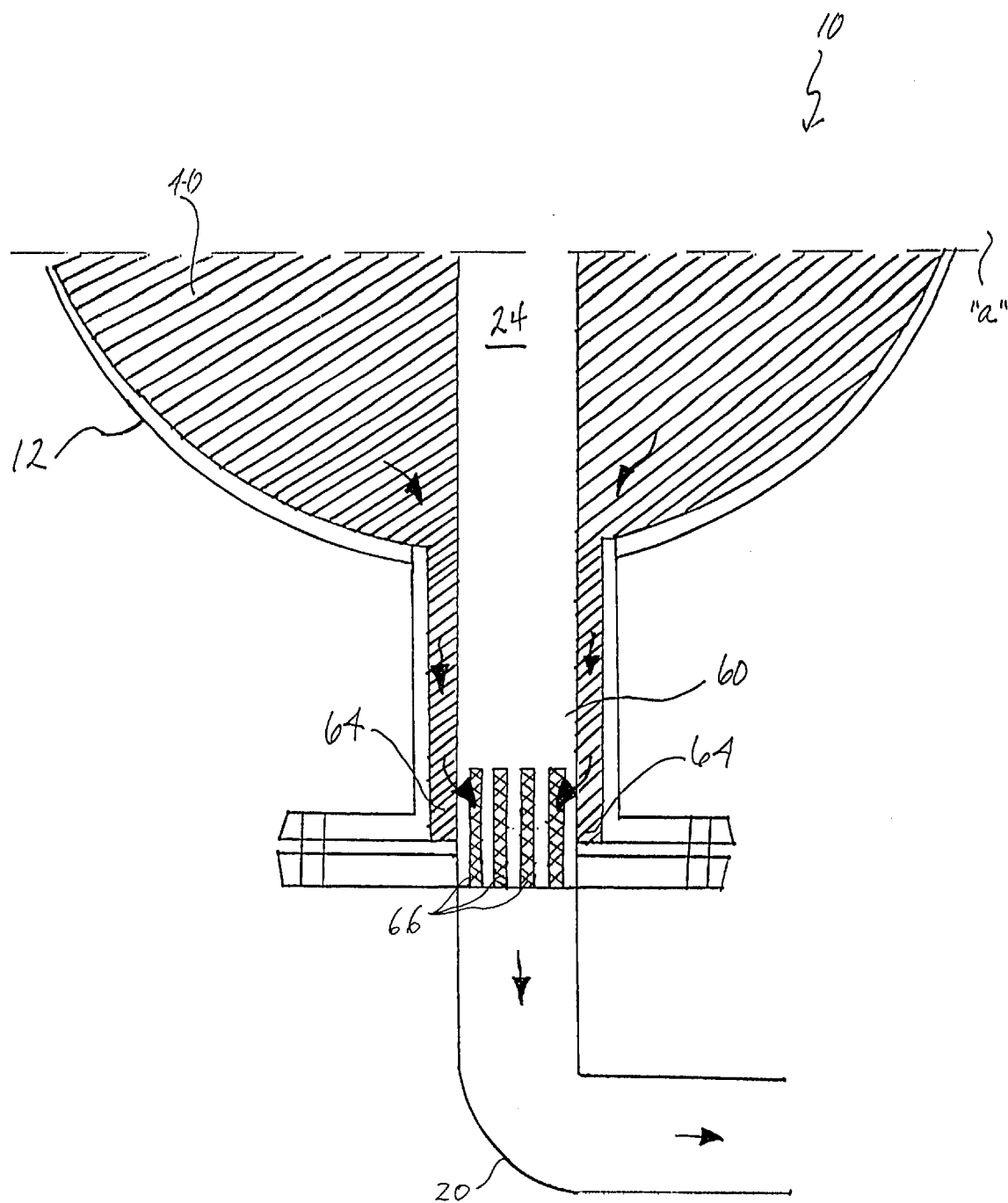
FIG. 4 is a schematic cross-sectional illustration of a portion of the filtration system shown in FIG. 1.

FIG. 4 is a schematic cross sectional view of a scavenging apparatus 60 that reduces or eliminates substantially all of the dead spots in filtration system 10. Scavenger 60 includes a plurality of apertures 66, and is positioned at a bottom portion of the chamber, preferably scavenger 60 is positioned in the lowest point in chamber 12, preferably at the bottom of well 64. Scavenger 60 is adapted to provide fluid communication between the interior of chamber 12 and conduit 20. Scavenger 60 may be any device, including, for example, a screen that allows passage of the fluid contained in the chamber while preventing the passage of the filter media. For example, apertures 66 may be any shape or size, such as, for example, slots or holes in a conduit wall, a sieve, a wire mesh, or a semipermeable membrane. In a preferred embodiment, scavenger 60 includes a plurality of apertures 66 that are sized so that even partially eroded particles of the filter bed 40 will not become lodged therein. If there are additional conduits in the filter system, there may be additional low points which will require additional scavengers. Preferably, scavenger 60 is configured so that it requires little or no maintenance. More preferably, the scavenger will also be configured so that it does not clog and close-up after extended use.

The scavenger is sized to provide adequate flow of condensate from the chamber during steam disinfection. Preferably, the scavenger is small enough so that only a small amount of flow passes through the scavenger during forward flow or backwash procedures. This provides for a majority of the flow to pass through the manifold 46 and screened distributors 44. Moreover, scavenger 60 is preferably sized to prevent passage of particles that make up the filter bed. It is most preferable that the scavenger is sized so that enough fluid may drain through to prevent any build-up of condensate during steam cleaning. In one embodiment, scavenger 60 is configured so that it may be opened or closed. In another embodiment the scavenger is adjustable between the opened and closed positions.

By including scavenger 60 in the system as shown in FIG. 4, the water level continues to drop below line "a" (also shown in FIG. 1) as the scavenger is situated in the bottom of well 64, the lowest point in the chamber. The water continues to drain until the entire chamber is essentially free of standing water or dead spots. When the chamber is allowed to drain or when condensate forms in the chamber, drainage occurs through the scavenger, allowing the chamber to drain more completely. By including scavenger 60, the condensate is allowed to drain out of the chamber as it condenses. In this manner, organic contaminants are more completely removed from the system and the risk of receiving a "slug" of organics upon system re-start is reduced. Likewise, the risk from microbiological contamination is also decreased.

In addition to providing improved cleaning and sanitization of the filter chamber 12, scavenger 60 may also provide more complete fluidization, during the backwash cycle, of the particles held in the lower part of the chamber. More complete fluidization results in a more complete cleansing of the filtration bed particles, i.e., it helps remove more material that has been trapped or adsorbed by the filter. The greater the number of particles that are fluidized and therefore allowed to abrade against one another or other parts of the system, the greater the level of cleaning that is achieved. The use of the scavenger 60 may allow for fluidization of filtration bed particles that otherwise would not have been fluidized. Thus, the scavenger may provide both improved abrasive cleaning of materials trapped by the filter as well as improved removal of adsorbed compounds during the steaming procedure.

The invention may be further understood with reference to the following examples. These examples are intended to serve as illustrations and not limitations of the present invention as defined in the claims herein.

EXAMPLES

Figure 5:
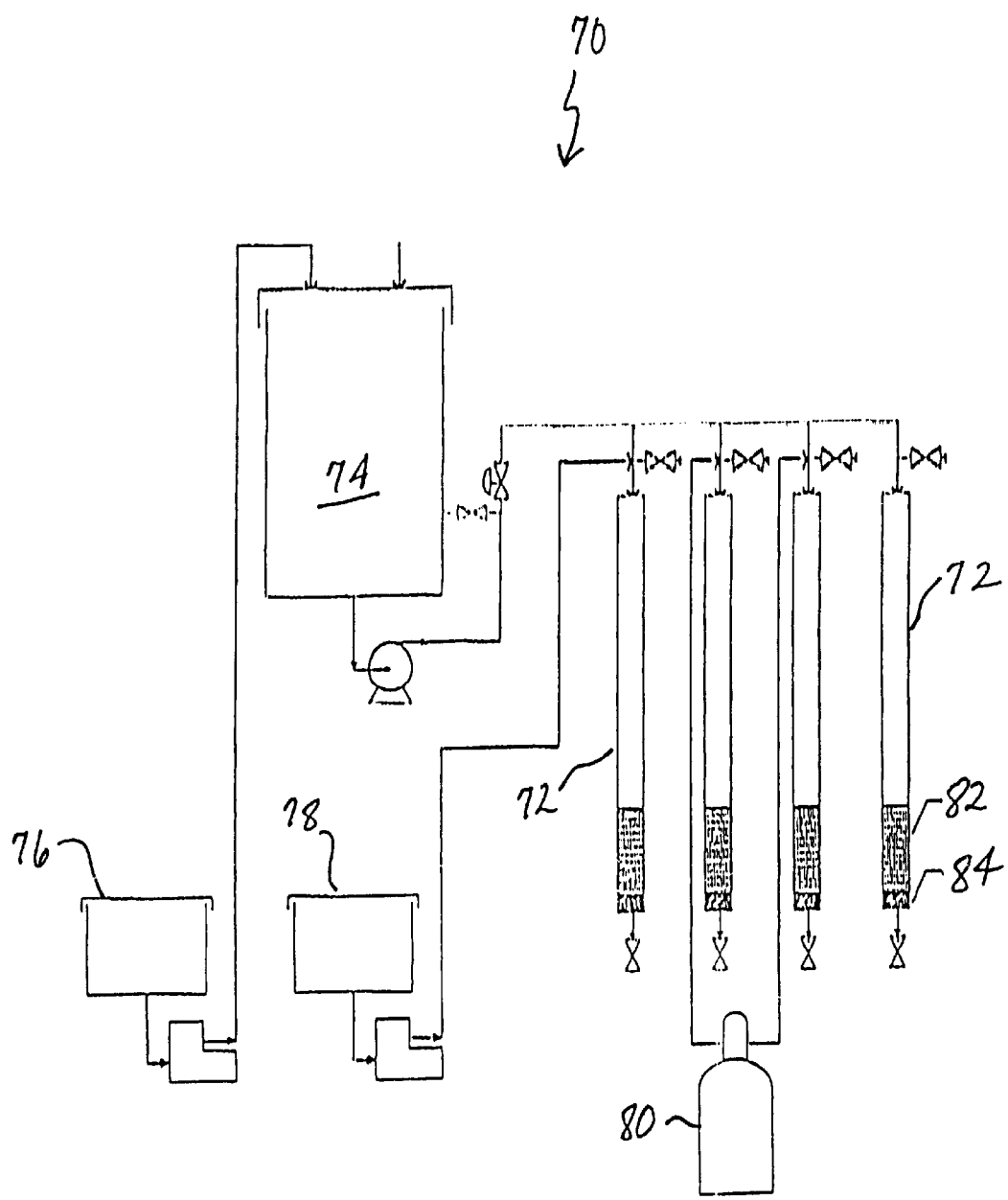
FIG. 5 is a schematic illustration of a test apparatus.

Tests were performed to evaluate the affect of pH on chloramine removal. A filtration apparatus 70 as illustrated in FIG. 5 was used for the tests. The apparatus included four 1" diameter filtration columns 72 arranged in parallel. A feed water tank 74 was fluidly connected to each of the columns. A source of sodium hypochlorite and ammonium chloride 76 was fluidly connected to the feed tank 74, for adding total, combined chloramines to the feed water. A source of sodium hydroxide 78 was fluidly connected to the first column for increasing the pH of the feed water. A source of carbon dioxide 80 was fluidly connected to the second and third columns, for decreasing the pH of the feed water. The fourth column was used for control purposes. The filtration columns 72 were filled with a filtration media 82 supported by support 84.

The pH in the feed and product for each column was measured periodically using a Myron-L pH meter. The total chlorine and free chlorine in the feed and product for each column were measured periodically using DPD photometric method, DPD free and total chlorine test reagents, on a Hach DR2000 spectrophotometer.

Example I

Two of the filtration columns were used to compare the affect of pH on chloramine removal. The columns were filled with 8" of 12×40 mesh anthracite based GAC (available as AG502-AW from United States Filter Corporation, Lowell, Mass.).

The raw water was continuously injected with a monochloramine solution to maintain a total chlorine feed concentration of about 1 ppm. The raw water injected with chloramine was used as the feed for two of the filtration columns. The pH of the feed, which was used as a control, was about 7.3. The pH of the feed for the other column was adjusted to about 5.3 by injecting carbon dioxide. The product flow for both columns was approximately 103 ml/min, which is equivalent to a residence time of 1 minute and a superficial velocity of 5 gpm/ft$^2$.

Figure 6:
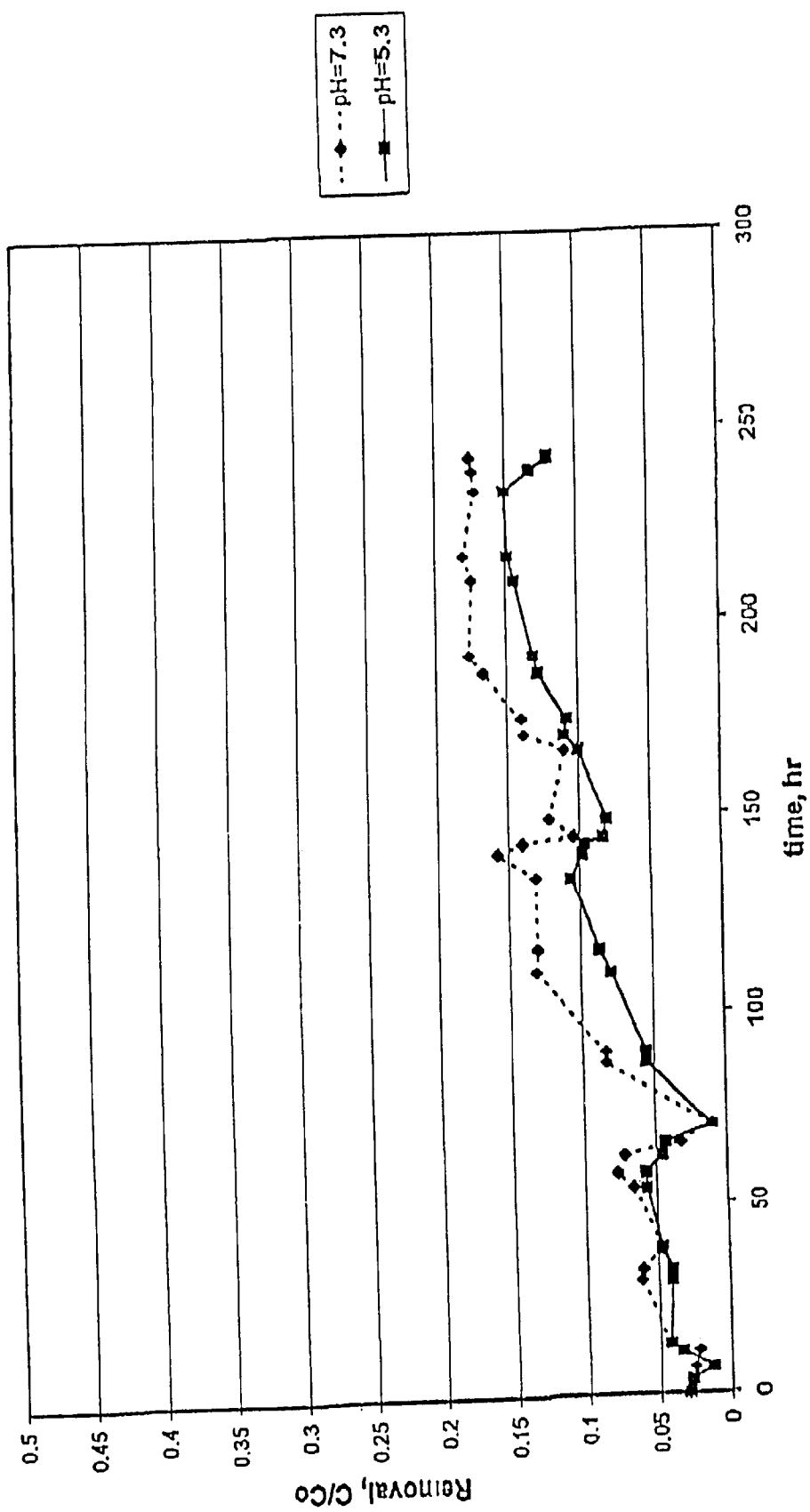
FIG. 6 is a graph comparing the effect of pH on chloramine removal.

The results are shown in FIG. 6. $C/C_o$ is the ratio of the concentration of chlorine in the effluent to the concentration of chlorine in the feed water. Using $C/C_o=0.05$ as the breakthrough endpoint, and ignoring several spikes due to system upsets, the column with a feed pH of 7.3 broke through at about 30 hours, whereas the column with a feed pH of 5.3 broke through at about 50 hours. The graphs show that the pH of the incoming water has a significant effect on the removal of chloramines. In the present example, reducing the pH of the feed to about 5.3 extended the bed life by over 50%.

Example II

Four of the filtration columns were used to compare the affect of pH on chloramine removal. The columns were filled with 8" of 12×40 mesh anthracite based GAC (available as AG502-AW from United States Filter Corporation, Lowell, Mass.).

The raw water was continuously injected with a monochloramine solution to maintain a total chlorine feed concentration of about 2 ppm. The raw water injected with chloramine was used as the feed for each of the filtration columns. The pH of the feed was about 7.3. The pH of the feed for three of the columns was adjusted before introduction into the columns. The pH of the feed for the first column was increased to about 10.0 by injecting sodium hydroxide. The pH of the feed for the second column was reduced to about 5.3, and for the third to about 4.6, by injecting carbon dioxide gas into the feed. The fourth column was used as a control, with the feed water having a pH of 7.3. The product flow for each column was approximately 83 ml/min, which is equivalent to a residence time of 1.25 minute and a superficial velocity of 4 gpm/ft$^2$.

Figure 7:
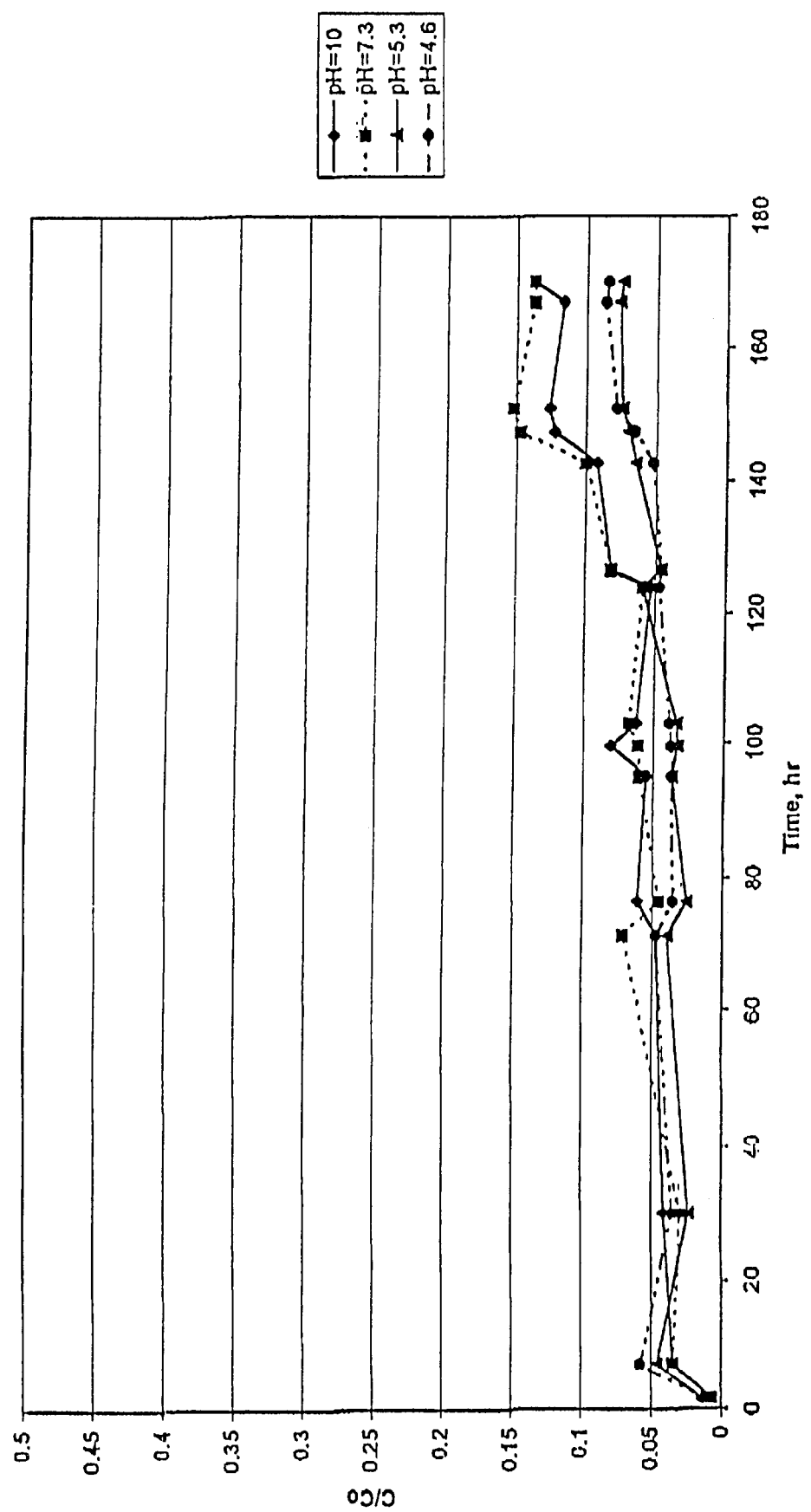
FIG. 7 is a graph comparing the effect of pH on chloramine removal.
Figure 1:
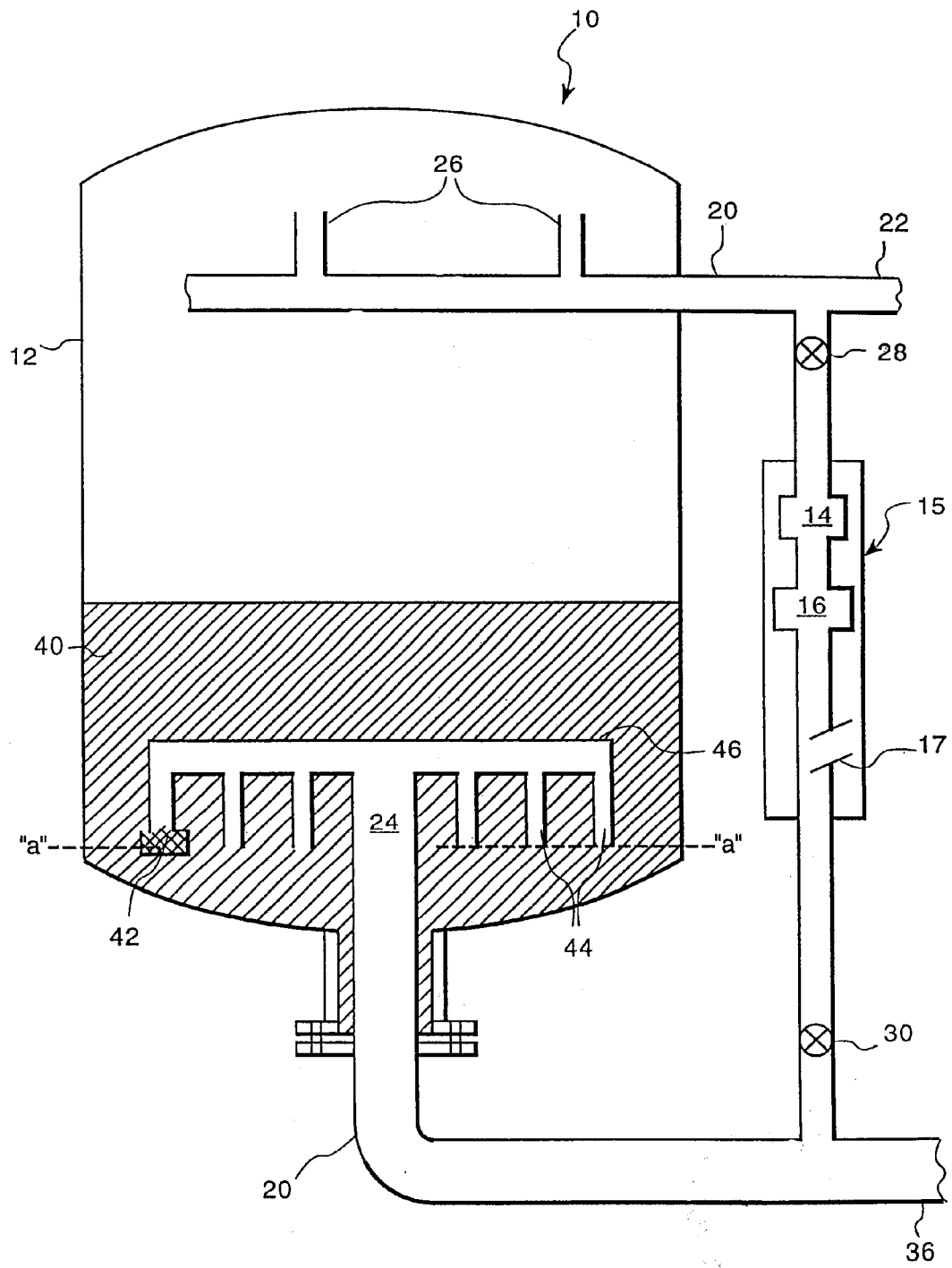
Figure 2:
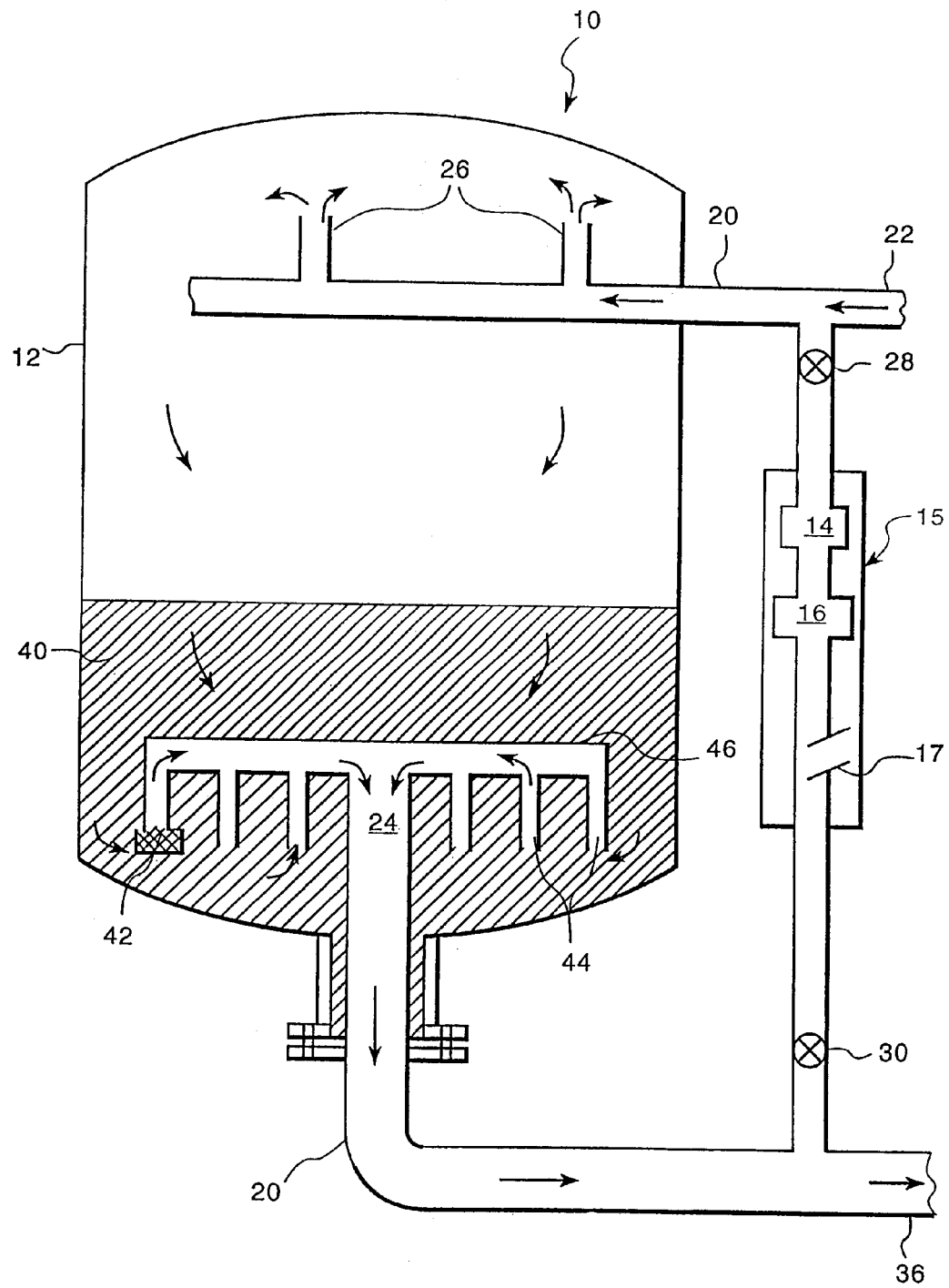
Figure 3:
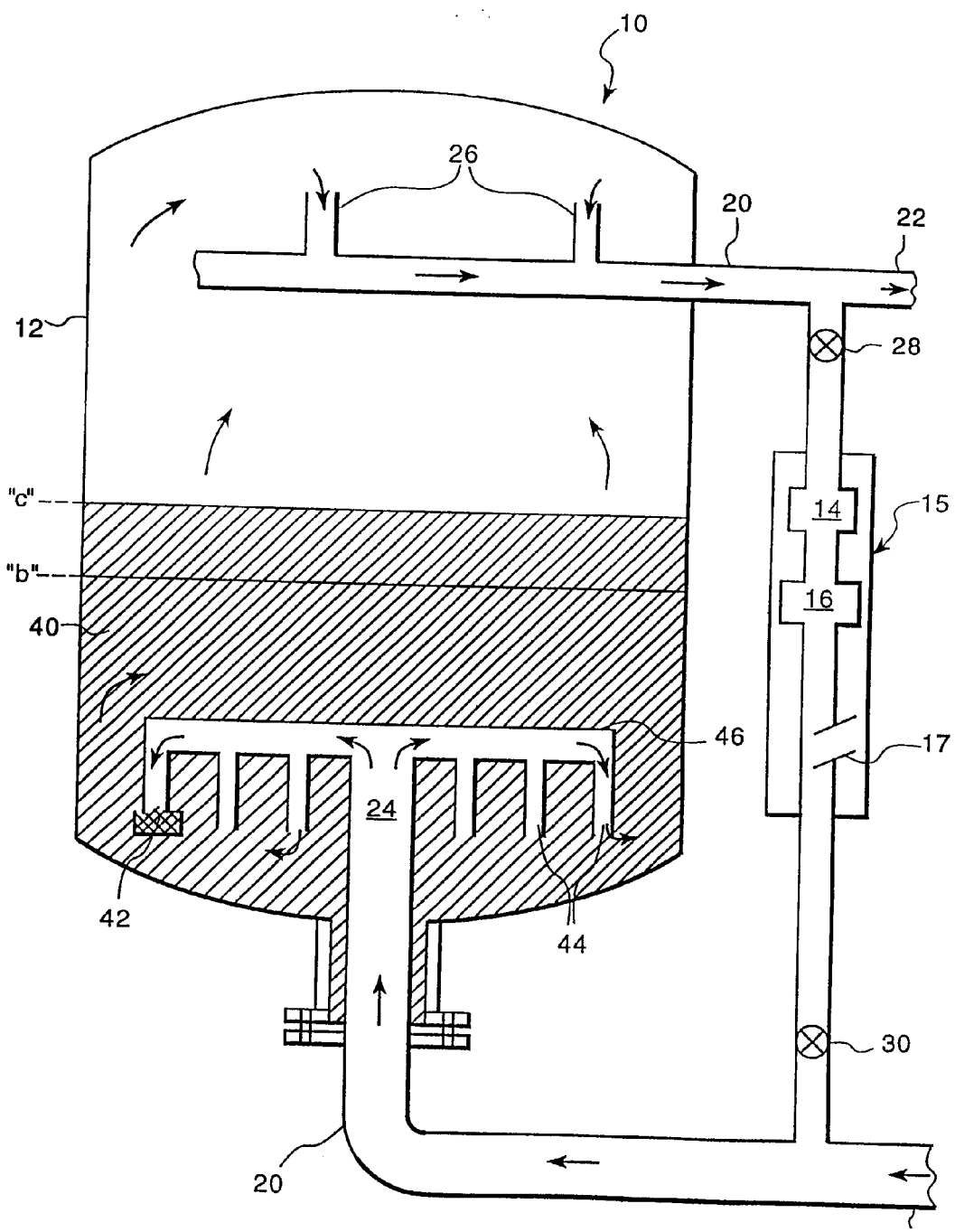
Figure 3A:
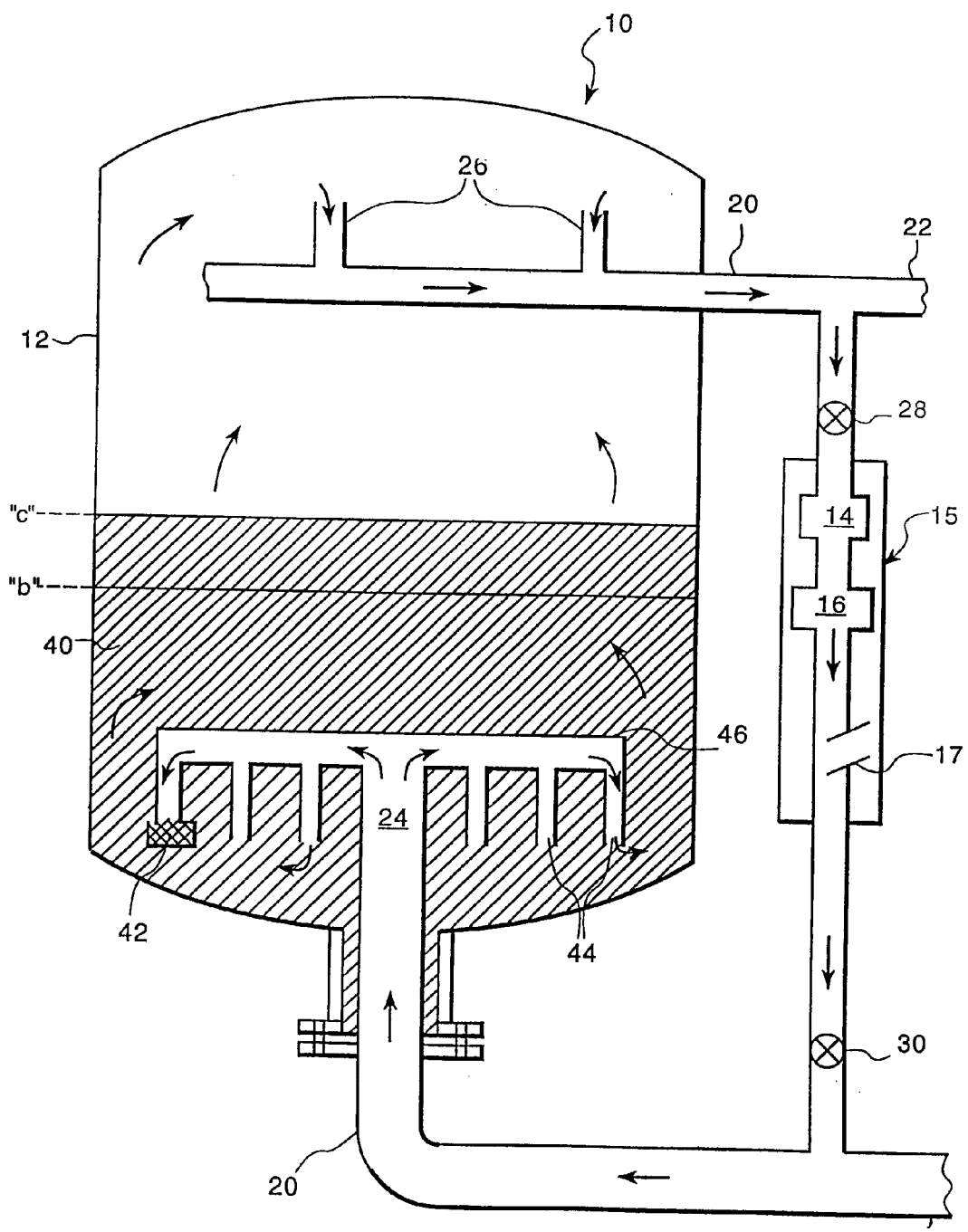
Figure 4:
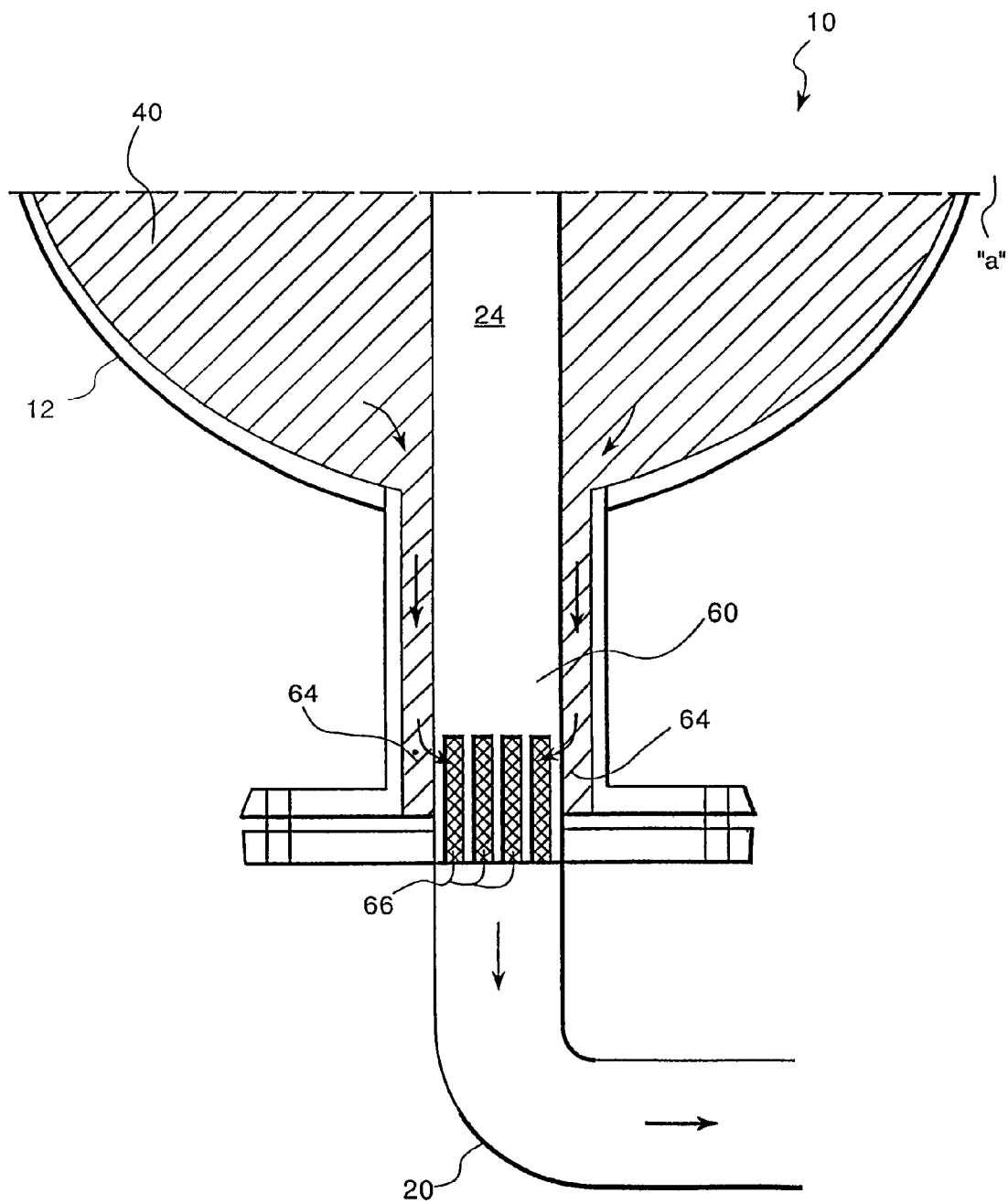
Figure 5:
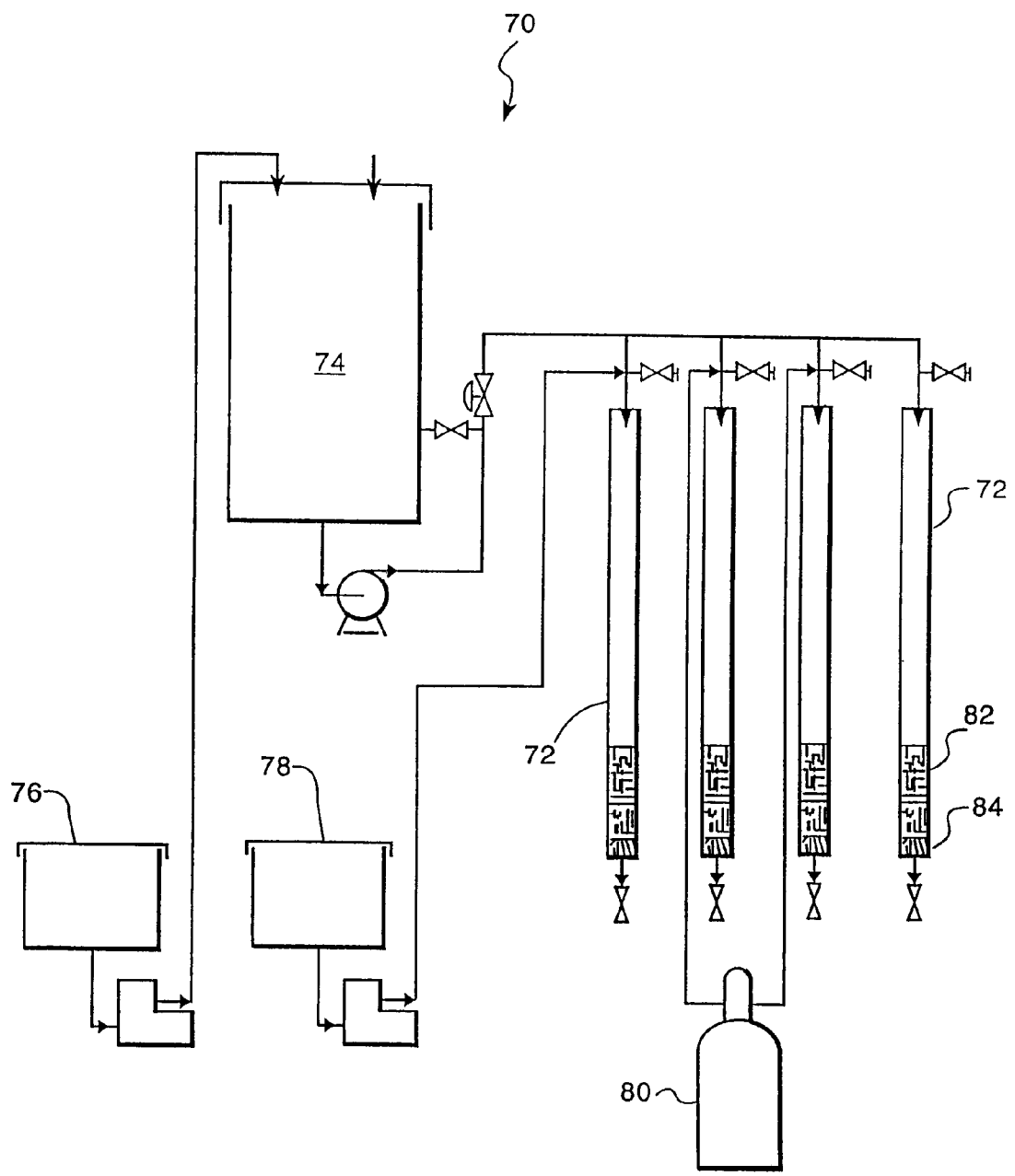
Figure 6:
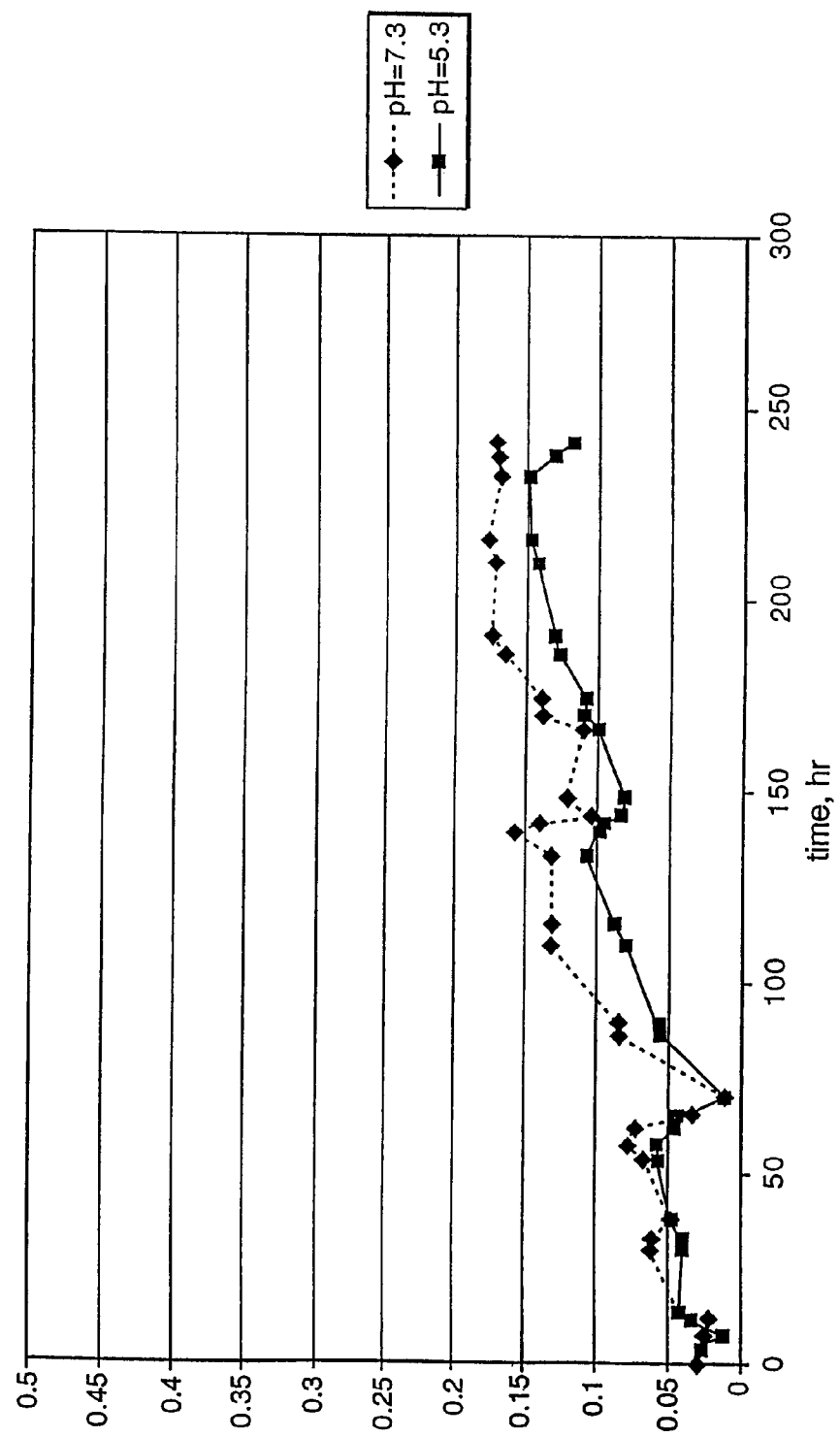
Figure 7:
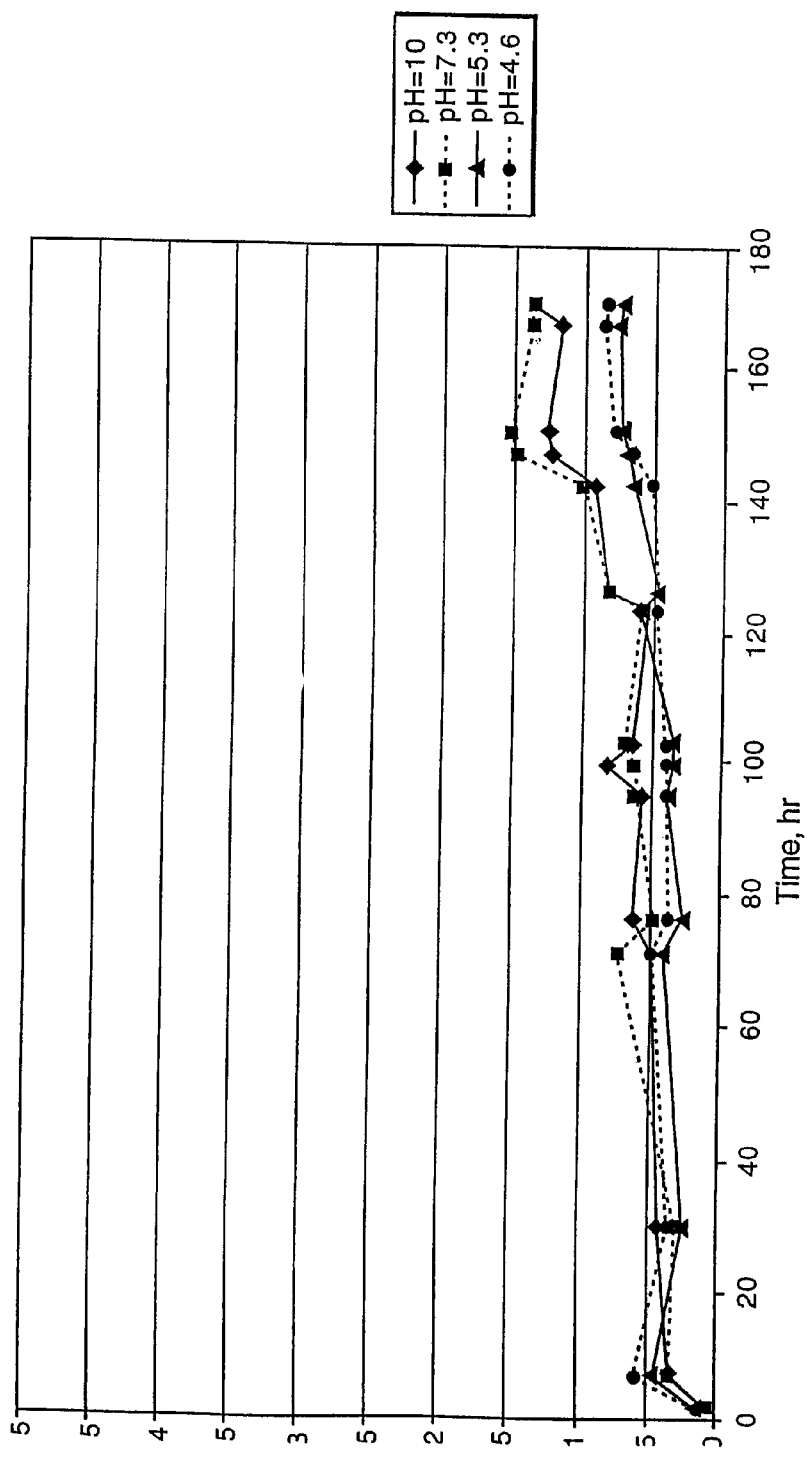

The results are shown in FIG. 7. As in the previous example, the results show that the pH of the incoming water has a significant affect on the removal of chloramines. Using $C/C_o=0.05$ as the endpoint, the columns with an influent pH of 4.6 and 5.3 broke through at about 120 hours; and the columns with influent pH of 10.0, and the control, broke through at about 80 hours. The pH reduction effectively extended the bed life by about 50%.

The results show that pH reductions using $CO_2$ provided improved removal of chloramines, and increased filtration bed life.

Further modifications and equivalents of the invention herein disclosed will occur to persons skilled in the art using no more than routine experimentation, and all such modifications and equivalents are believed to be within the spirit and scope of the invention as defined by the following claims.

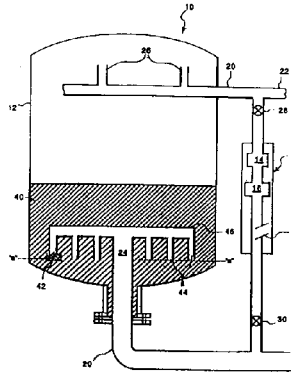

What is claimed is:

1. A method for sanitizing a filtration apparatus, comprising the steps of:
   providing a filtration apparatus having an inlet at a first end, an outlet at a second end, and a filtration media positioned between the outlet and the inlet;
   adjusting the pH of a fluid; and
   allowing the fluid at a temperature of at least 160° F. to flow through the apparatus in a direction opposite to that of normal operational flow for a period of time sufficient to deactivate any micro-organisms contained in the apparatus.

2. The method of claim 1, further comprising the step of heating the fluid to a temperature of at least about 170° F.

3. The method of claim 2, wherein the fluid is heated to a temperature of at least about 180° F.

4. The method of claim 1, wherein the pH of the fluid is adjusted to less than about 6.0.

5. The method of claim 4, wherein the pH of the fluid is adjusted to less than about 5.0.

6. The method of claim 5, wherein the pH of the fluid is adjusted to less than about 4.0.

7. The method of claim 6, wherein the fluid is allowed to flow through the apparatus for a period of time of less than about 5 minutes.

8. The method of claim 7, wherein the pH of the fluid is adjusted by introducing carbon dioxide into the fluid.

9. The method of claim 6, wherein the pH of the fluid is adjusted by introducing carbon dioxide into the fluid.

10. The method of claim 5, wherein the fluid is allowed to flow through the apparatus for a period of time of less than about 10 minutes.

11. The method of claim 10, wherein the pH of the fluid is adjusted by introducing carbon dioxide into the fluid.

12. The method of claim 5, wherein the pH of the fluid is adjusted by introducing carbon dioxide into the fluid.

13. The method of claim 4, wherein the fluid is allowed to flow through the apparatus for a period of time of less than about 15 minutes.

14. The method of claim 13, wherein the pH of the fluid is adjusted by introducing carbon dioxide into the fluid.

15. The method of claim 4, wherein the pH of the fluid is adjusted by introducing carbon dioxide into the fluid.

16. The method claim 1, wherein the pH of the fluid is raised.

17. The method of claim 16, wherein the pH of the fluid is raised to greater than about 8.0.

18. The method of claim 16, wherein the pH of the fluid is raised to greater than about 9.0.

19. The method of claim 16, wherein the pH of the fluid is raised to greater than about 10.0.

20. A method for providing a substantially chloramine-free aqueous filtrate, comprising the steps of:
    reducing the pH of an aqueous fluid containing monochloramine by adding carbon dioxide;
    filtering the reduced pH aqueous fluid through a filter; and
    providing the substantially chloramine-free aqueous filtrate.

21. The method of claim 20, wherein the pH of the aqueous fluid is reduced to less than about 5.0.

22. The method of claim 21, wherein the pH of the aqueous fluid is reduced to less than about 4.5.

23. The method of claim 22, wherein the pH of the aqueous fluid is reduced to less than about 4.0.

24. The method of claim 20, wherein the filter is a particulate filter bed.

25. The method of claim 24, wherein the particulate filter bed includes GAC.

26. The method of claim 25, wherein the pH of the aqueous fluid is reduced to less than about 5.0.

27. The method of claim 26, wherein the pH of the aqueous fluid is reduced to less than about 4.5.

28. The method of claim 27, wherein the pH of the aqueous fluid is reduced to less than about 4.0.

29. A method of providing substantially chloramine-free water, comprising the steps of:

reducing the pH of water containing monochloramine;

filtering the water through a bed of GAC; and providing substantially chloramine-free water.

30. The method of claim 29, wherein the pH of the water is reduced to less than about 5.0.

31. The method of claim 30, wherein the pH of the water is reduced by adding carbon dioxide to the water.

32. The method of claim 30, wherein the pH of the water is reduced to less than about 4.5.

33. The method of claim 32, wherein the pH of the water is reduced by adding carbon dioxide to the water.

34. The method of claim 32, wherein the pH of the water is reduced to less than about 4.0.

35. The method of claim 34, wherein the pH of the water is reduced by adding carbon dioxide to the water.

* * * * *

UNITED STATES PATENT AND TRADEMARK OFFICE
CERTIFICATE OF CORRECTION

PATENT NO. : 6,342,163 B1
DATED : January 29, 2002
INVENTOR(S) : Harry C. DeLonge et al.

It is certified that error appears in the above-identified patent and that said Letters Patent is hereby corrected as shown below:

The Title page should be deleted and substitute therefor the attached title page.

<u>Drawings,</u>
Sheet 1 of 8, FIG. 1, should appear as shown on attached Sheet 1
Sheet 2 of 8, FIG. 2, should appear as shown on attached Sheet 2
Sheet 3 of 8, FIG. 3, should appear as shown on attached Sheet 3
Sheet 4 of 8, FIG. 3A, should appear as shown on attached Sheet 4
Sheet 5 of 8, FIG. 4, should appear as shown on attached Sheet 5
Sheet 6 of 8, FIG. 5, should appear as shown on attached Sheet 6
Sheet 7 of 8, FIG. 6, should appear as shown on attached Sheet 7
Sheet 8 of 8, FIG. 7, should appear as shown on attached Sheet 8

Signed and Sealed this

Eighth Day of October, 2002

Attest:

Attesting Officer

JAMES E. ROGAN
*Director of the United States Patent and Trademark Office*

(12) United States Patent
DeLonge et al.

(10) Patent No.: US 6,342,163 B1
(45) Date of Patent: Jan. 29, 2002

(54) APPARATUS AND METHOD FOR SANITIZING AND CLEANING A FILTER SYSTEM

(75) Inventors: Harry C. DeLonge, Amenia, NY (US); Michael G. Costello, Nashua, NH (US); Karen L. Asher, Cincinnati, OH (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/438,214

(22) Filed: Nov. 12, 1999

(51) Int. Cl.⁷ .............................. C02F 1/00; B01D 24/46
(52) U.S. Cl. ...................... 210/749; 210/764; 210/108; 210/275
(58) Field of Search ................................ 210/749, 754, 210/755, 764, 766, 106, 108, 269, 275, 902; 422/38

(56) References Cited

U.S. PATENT DOCUMENTS

| | | | |
|---|---|---|---|
| 3,623,978 A | 11/1971 | Boze | 210/54 |
| 3,817,378 A | 6/1974 | Ross | 210/80 |
| RE28,458 E | 7/1975 | Ross | 210/80 |
| 3,974,074 A | 8/1976 | Purdey | 210/81 |
| 4,032,443 A | 6/1977 | Ross | 210/82 |
| 4,177,143 A | 12/1979 | Myers | 210/82 |
| 4,187,175 A | 2/1980 | Roberts et al. | 210/80 |
| 4,228,000 A | 10/1980 | Hoeschler | 210/673 |
| 4,331,542 A | 5/1982 | Emrie | 210/794 |
| 4,366,065 A | 12/1982 | Leslie et al. | 210/695 |
| 4,415,461 A | 11/1983 | Mansel et al. | 210/757 |
| 4,770,793 A | 9/1988 | Treffry-Goatley et al. | 210/769 |
| 4,784,169 A | 11/1988 | Striedieck | 134/111 |
| 4,818,414 A | 4/1989 | Ross | 210/744 |
| 4,923,068 A * | 5/1990 | Crowson | |
| 4,923,601 A | 5/1990 | Drori | 210/107 |
| 5,043,071 A | 8/1991 | Anselme et al. | 210/636 |
| 5,066,402 A | 11/1991 | Anselme et al. | 210/636 |
| 5,080,808 A | 1/1992 | Kim et al. | 210/792 |
| 5,114,595 A | 5/1992 | Hensely | 210/792 |
| 5,166,220 A | 11/1992 | McMahon | 521/26 |
| 5,198,124 A | 3/1993 | Kim et al. | 210/792 |
| 5,221,486 A | 6/1993 | Fassbender | 210/757 |
| 5,227,048 A | 7/1993 | Seibel et al. | 210/94 |
| 5,246,601 A | 9/1993 | Jensen | 210/787 |
| 5,271,849 A | 12/1993 | Devries | 210/747 |
| 5,277,828 A | 1/1994 | Fleming | 210/792 |
| 5,290,457 A | 3/1994 | Karbachsch et al. | 210/792 |
| 5,338,458 A * | 8/1994 | Carrubba et al. | |
| 5,368,752 A | 11/1994 | Vor | 210/792 |
| 5,374,351 A | 12/1994 | Bolton et al. | 210/97 |
| 5,393,433 A | 2/1995 | Espenan et al. | 210/650 |
| 5,476,584 A | 12/1995 | McDougald | 210/108 |
| 5,620,607 A | 4/1997 | Bowie, Jr. | 210/702 |

* cited by examiner

Primary Examiner—Betsey Morrison Hoey
(74) Attorney, Agent, or Firm—Wolf, Greenfield & Sacks, P.C.

(57) ABSTRACT

An apparatus and methods for sanitizing and cleaning filtration systems is provided. The apparatus includes a chamber fluidly connected to a source of fluid for backwashing the system, and a heat exchanger for increasing the temperature of the fluid. A filter media is positioned within the chamber. The method of sanitization involves backwashing the apparatus to remove debris, then continuing to circulate the backwash fluid through the system while increasing the temperature of the fluid, until the temperature of the water and apparatus is sufficient to deactivate microorganisms. The method may also involve increasing the disinfecting power of the fluid by adjusting the pH of the fluid. The apparatus may be provided with a scavenger to assist in the substantially complete removal of fluid from the chamber during and after a steaming or cleaning process. The method may also involve reducing the pH of the feed water during normal operation to convert monochloramines to dichloramine and trichloramine in order to aid in the removal of chloramines from the feed water.

35 Claims, 8 Drawing Sheets